United States Patent [19]

Tonge et al.

[11] Patent Number: 5,204,388
[45] Date of Patent: Apr. 20, 1993

[54] AQUEOUS SURFACE COATING MATERIAL PREPARED BY EMULSION POLYMERIZATION

[75] Inventors: Christopher J. Tonge, Darwen; John P. Tomlinson, Hoddlesden; Thomas Graham, Clitheroe, all of England

[73] Assignee: Crown Decorative Products Limited, Derby, England

[21] Appl. No.: 860,575

[22] Filed: Mar. 30, 1992

Related U.S. Application Data

[63] Continuation of Ser. No. 657,255, Feb. 19, 1991, abandoned, which is a continuation of Ser. No. 334,870, Apr. 7, 1989, abandoned.

[30] Foreign Application Priority Data

Apr. 13, 1988 [GB] United Kingdom ............... 8808755

[51] Int. Cl.$^5$ .................. C08L 1/00; C08L 3/00; C08K 5/00; C08K 9/00
[52] U.S. Cl. .................. 524/30; 524/732; 524/733; 524/734; 523/200; 523/205
[58] Field of Search .......... 524/30, 732, 733, 734; 523/200, 205

[56] References Cited

U.S. PATENT DOCUMENTS

| | | | |
|---|---|---|---|
| 3,544,500 | 12/1970 | Osmond et al. | 523/205 |
| 4,391,928 | 7/1983 | Herman et al. | 525/902 |
| 4,399,237 | 8/1983 | Morrison, Jr. | 521/138 |
| 4,421,660 | 12/1983 | Hajna | 252/62.54 |
| 4,572,869 | 2/1986 | Wismer et al. | 521/92 |
| 4,608,401 | 8/1986 | Martin | 523/205 |
| 4,609,608 | 9/1986 | Solc | 430/106.6 |
| 4,771,086 | 9/1988 | Martin | 524/733 |

FOREIGN PATENT DOCUMENTS

| | | |
|---|---|---|
| 1220777 | 1/1971 | Canada . |
| 0054832 | 6/1982 | European Pat. Off. . |
| 081306 | 6/1983 | European Pat. Off. . |
| 0083188 | 7/1983 | . |
| 0104498 | 4/1984 | European Pat. Off. . |
| 0145325 | 6/1985 | European Pat. Off. . |
| 0154739 | 9/1985 | European Pat. Off. . |
| 0203724 | 12/1986 | European Pat. Off. . |
| 0254467 | 1/1988 | European Pat. Off. . |
| 1005434 | 9/1965 | United Kingdom . |
| 1029566 | 5/1966 | United Kingdom . |
| 1172513 | 11/1966 | United Kingdom . |
| 1282634 | 7/1972 | United Kingdom . |
| 1395065 | 5/1975 | United Kingdom . |
| 1557269 | 12/1979 | United Kingdom . |
| 2061293 | 5/1981 | United Kingdom . |
| 2109799 | 6/1983 | United Kingdom . |
| 2112400 | 7/1983 | United Kingdom . |
| 8002687 | 12/1980 | World Int. Prop. O. . |

OTHER PUBLICATIONS

"TIOXID", Polymers Paint Color Journal, vol. 177, No. 4196, p. 517, Jul. 22, 1987.
"ROPAQUE", Polymers Paint Color Journal, vol. 177, No. 4196, Jul. 22, 2987, p. 514.

Primary Examiner—Nathan M. Nutter
Assistant Examiner—P. Hampton-Hightower
Attorney, Agent, or Firm—William R. Hinds

[57] ABSTRACT

A water-based emulsion paint, for example, is formulated with high refractive index opacifying pigment particles, dispersant, and polymer particles in which substantially all of the pigment particles (40) are disjuncted from one another and contained within an attached cluster of polymer particles (41) or have appendant polymer particles to give opacifying units having a nodular outline. Preferably micro-voids are trapped between particles and the dispersant is less than 1% of the pigment by weight.

13 Claims, 4 Drawing Sheets

AQUEOUS SURFACE COATING MATERIAL PREPARED BY EMULSION POLYMERIZATION

This is a continuation of application Ser. No. 657,255 filed Feb. 19, 1991, which is a continuation of Ser. No. 334,870 filed Apr. 7, 1989, both now abandoned.

This invention relates to aqueous surface coatings requiring opacity and particularly to water-based emulsion paints. The invention is concerned with the improvement of aqueous surface coatings in respect of qualities such as opacity, rheology, gloss and durability.

It is well appreciated that white opacity is realised by the scattering of incident light and that high refractive index (e.g. typically greater than 1.8) opacifying pigments such as titanium dioxide, zirconium oxide, zinc oxide, zinc sulphide, and antimony oxide, etc. are commonly used to this end. In attempts to reduce the cost of using such pigments so extensively in emulsion paints, and other products requiring opacity, efforts have been made to introduce microscopic voids and other techniques such as controlled spacing of pigment particles to intensify opacity which can be offset, if required, by reducing (or in some cases, eliminating) the pigment investment. Reference is made, for example, to U.S. Pat. No. 4,572,869 (air-containing micro-capsules with pigment particles encapsulated in the walls of the microcapsules); EP 0203724A (micro-polymer spheres containing air); EP 0083188A (2-7 micron vesiculated polymeric beads containing pigment embedded in the polymer); and EP 0,154,739 and GB 1,172,513 (individual pigment particles encapsulated in polymer).

Development of opacity in emulsion paints is hampered by flocculation which can cause marked changes in opacity from the wet to the dry state. Many emulsion paints are very well dispersed in the wet state and, as the film dries, prime pigment particles have to be kept apart if opacity is to be maintained. Attractive forces increase as the drying process begins and often overcome electrostatic and steric repulsive forces.

A further possibility for keeping prime pigment particles apart is the use of fine particle size extender to physically separate the pigment particles. In practice the use of inorganic extenders in emulsion paints can result in a drop in opacity due to optical overlap caused by "crowding" of pigment particles. The levels of flocculation in dry emulsion paint films are invariably higher than those present in films produced from well dispersed liquid or lightly structured alkyd-based paints. A means of preventing pigment flocculation as an emulsion paint film dries would be of great value leading to improved durability in addition to increased opacity.

In addition to opacity, there is interest in producing emulsion paints having a desirable rheology so that their application characteristics approach more closely to those of a conventional alkyd-based gloss paint. In order to modify the application characteristics of emulsion paints thickeners are added to improve film build; cellulosics, alkali soluble acrylics, and urethane types are all used for this purpose. Thickeners are expensive, often degrade film properties, and give poor levelling due to pseudo-plasticity. The use of certain urethane-based thickeners gives emulsion paints with rheological characteristics closer to those of alkyd-based paints but these are very expensive and usually require the addition of organic solvents and/or surfactants to control rheology.

One of the major problems with water-based emulsion paint is the development of high gloss. There are many reasons for the lower gloss of emulsion paints compared to alkyd-based paints; these include poor film build, poor flow and increased surface scatter due to the absence of a clear layer on the surface.

In accordance with the present invention, an aqueous surface coating material contains opacifying units prepared in an emulsion polymerisation process in the presence of high refractive index opacifying pigment particles dispersed in a water phase before monomer is added, the units being characterized in that substantially all of the opacifying pigment particles in the units are disjuncted from one another and have non-enveloping appendant polymer particles to give a nodular outline.

The opacifying units can carry substantially all of the pigment and the polymer of a formulation, or carry only a percentage of these elements. All elements of the formulation could be together at the polymerisation stage. Alternatively, polymerisation can take place to form the opacifying units to which are subsequently added a coalescing agent and modifying additives.

Additional pigments may be employed such as extender pigments (clays and talcs), coloured pigments, or even further opacifying pigments. The additional pigments could be within opacifying units or could be incorporated separately into the formulation of the material. The polymer particles could be solid or gas-encapsulating envelopes in the dried film. The polymer particles could, with the pigment particles, trap micro-voids or micro-voids could be trapped between polymer particles. Where the opacifying units do not carry all the polymer of the formulation they can function to provide the opacity base of the formulation to which other polymers (not necessarily the same) can be added. The added polymers may coalesce to a different extent especially where it is decided (to optimise micro-voids and opacifying unit structure) that the polymer in the units should not be too highly coalesced. Thus the polymer in the units is coalesced only at its surface to achieve integration into the coating without seriously disrupting its original shape and characteristics.

The polymer in the opacifying units may have a greater or lesser degree of coalescence than the added polymer in the formulated material or higher or lower Minimum Film-Forming Temperature (MFFT).

Solvents (such as "white spirit") may be included (preferably at the polymerisation stage) which, in the first instance, may make the nodular outline of the opacifying units less distinct. During the process of drying of an applied film including such a solvent and opacifying unit, water is preferentially lost, followed by the coalescing solvent and said included solvent to give an opacity improvement.

Also in accordance with the present invention, there is provided an emulsion polymerisation process carried out in the presence of pigment for producing opacifying units as characterized previously, comprising dispersing high refractive index opacifying pigment particles in a water phase before monomer is added, adding monomer to the pigment dispersion, and effecting emulsion polymerisation of the monomer in the presence of the pigment to produce an aqueous dispersion of composite pigment/polymer particles constituting said opacifying units in which substantially all of the opacifying pigment particles in the units are disjuncted from one another and have non-enveloping appendant polymer particles to give a nodular outline.

BRIEF DESCRIPTION OF THE DRAWINGS

The invention will now be described further with reference to the accompanying drawings on which.

Whilst the micrographs may appear to present the particles 2-dimensionally, the polymer particles are, in fact, present around the pigment particles 3-dimensionally, the film of paint being thin enough to allow electron transmission.

Figure 1:
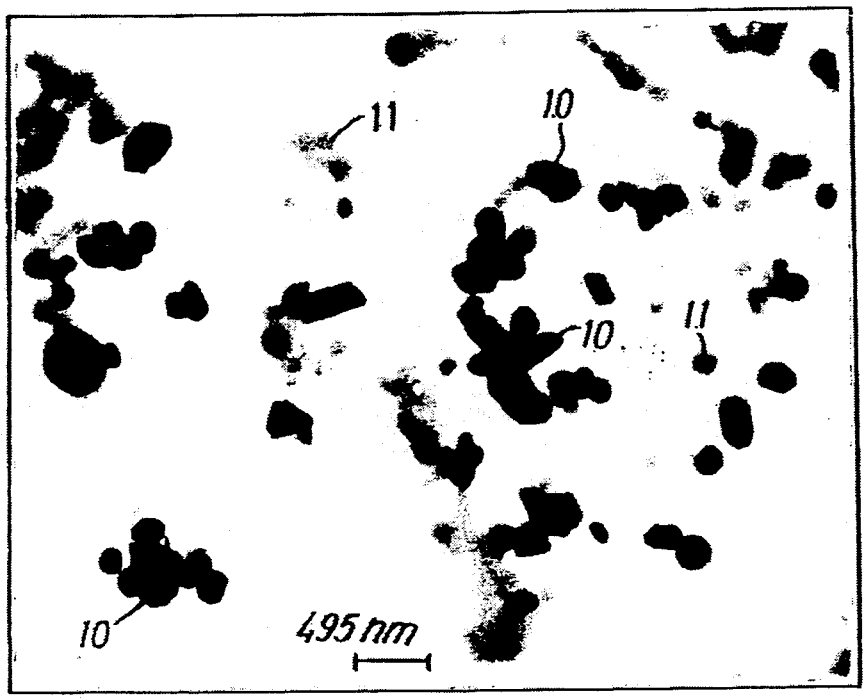
FIG. 1 (REFERENCE ART) is a reproduction of a "transmission" electron micrograph of a sprayed diluted film of a conventional emulsion paint.

In FIG. 1 (Reference art of a "conventional" emulsion paint) titanium dioxide particles 10 are shown in clusters and individually with a rather uneven distribution. Similarly, polymer particles 11 are shown in clusters and individually. A few particles 11 appear to be attached to or partly concealed by particles 10.

Figure 2:
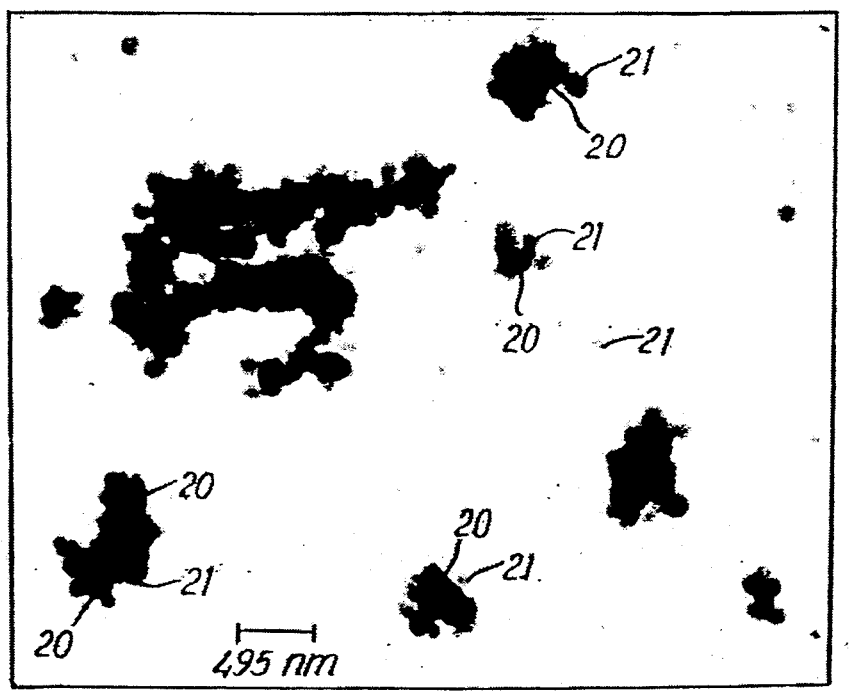
FIG. 2 is a reproduction of a "transmission" electron micrograph of a sprayed diluted film of an emulsion paint according to the invention.

In FIG. 2 titanium dioxide particles 20 are shown, for the most part, as disjuncted from each other and contained within a cluster of polymer particles 21 to form opacifying units with nodular outline. The clusters vary in size and occasionally isolated pigment particles 20 have their own small clusters of polymer particles 21. A few isolated polymer particles 21 exist. Some voids appear to exist between particles 21 or between particles 21 and 20.

Figure 3:
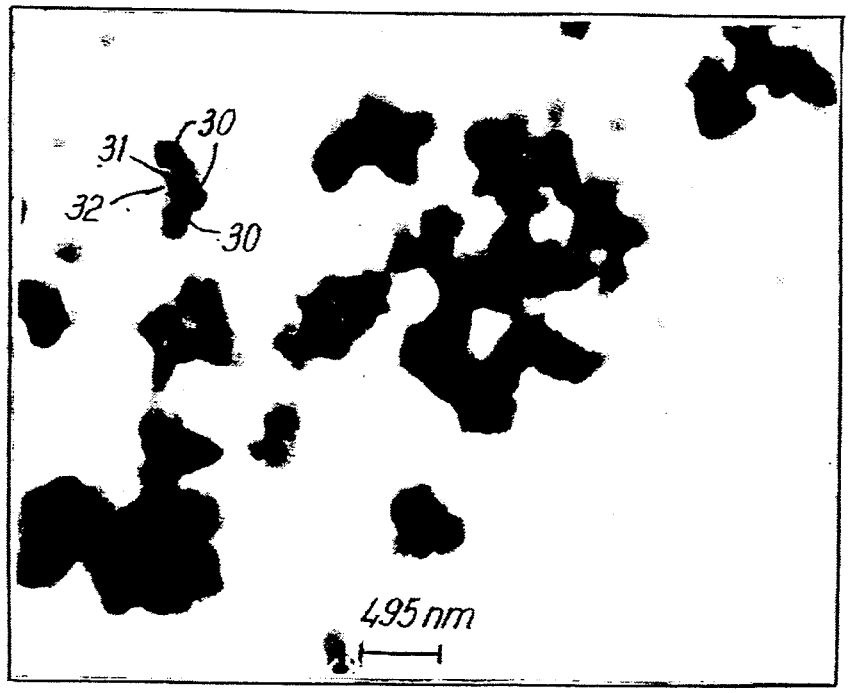
FIG. 3 is a reproduction of a "transmission" electron micrograph of a sprayed diluted film as in FIG. 2 but with a solvent added.

In FIG. 3 titanium dioxide particles 30 remain disjuncted from each other but the associated polymer particles 31 tend to form a smoother but still nodular envelope 32. (Taken to an extreme the nodular outline of the particles 31 can be lost and encapsulated pigment particles are obtained with loss of rheology.)

Figure 4:
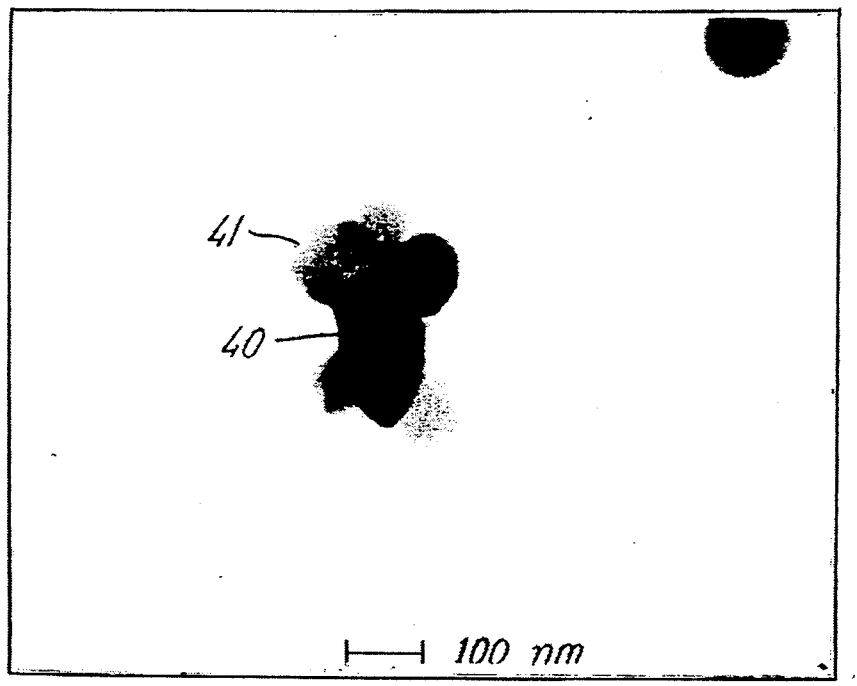
FIG. 4 is a reproduction of a "transmission" electron micrograph of a typical single opacifying unit according to the present invention taken from the bottom right-hand corner of FIG. 2.

In FIG. 4 the enlargement in the micrograph is such that a single opacifying unit is clearly shown. This unit comprises a titanium dioxide particle 40 having appendant polymer particles 41. It is believed that voids can exist between particles 41 and between particles 40 and 41.

Figure 5:
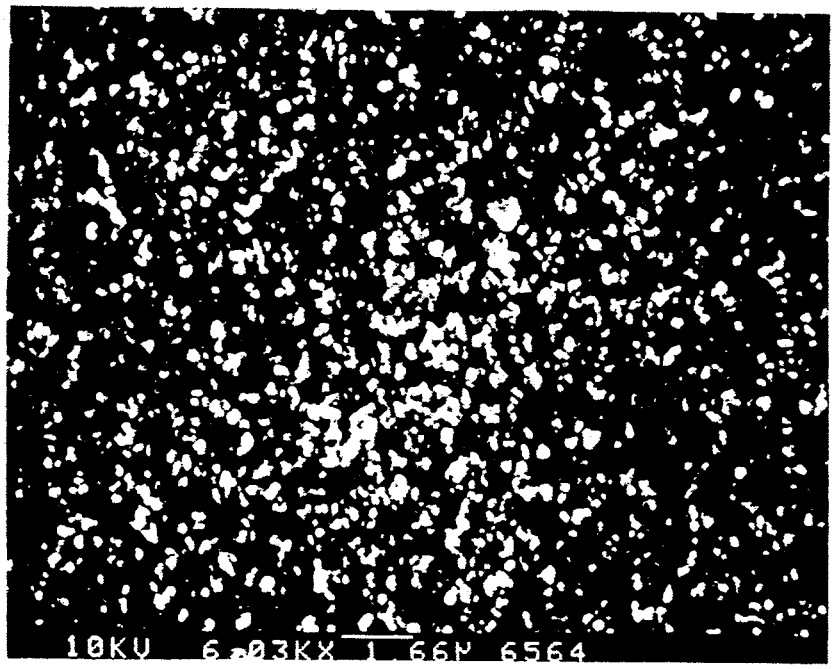
FIG. 5 is a "transmission" electron micrograph of an undiluted sample of a conventional emulsion paint in which the sample has been attacked by oxygen plasma to eat away polymer and expose pigment.
Figure 6:
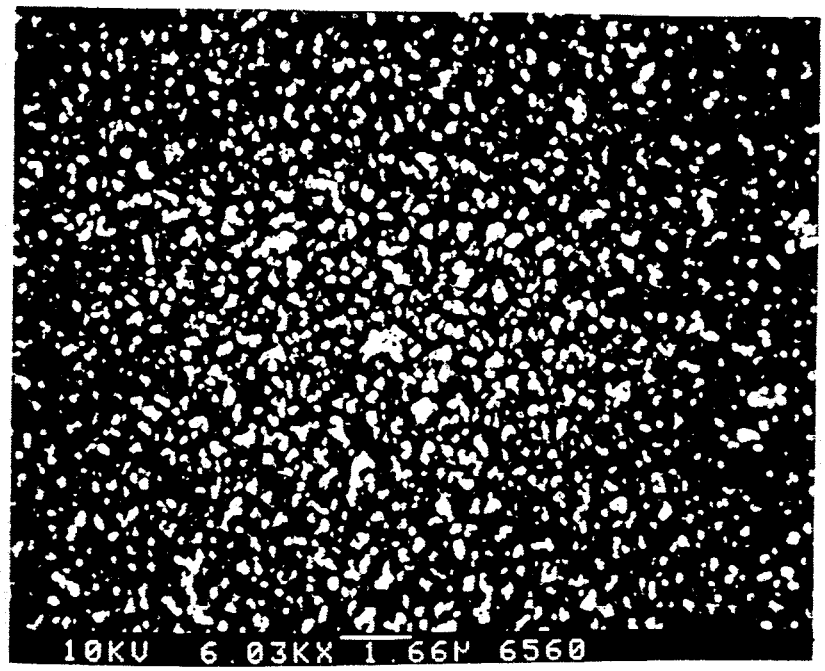
FIG. 6 is similar to FIG. 5 but relates to an emulsion paint according to the invention.

In FIGS. 5 and 6 the white elements represent pigment particles. In FIG. 5 (the Prior Art) the particles are seen to be more clustered whilst in FIG. 6 (the Invention) there is a less clustered appearance which is considered to arise with the disjuncted pigment.

Figure 7:
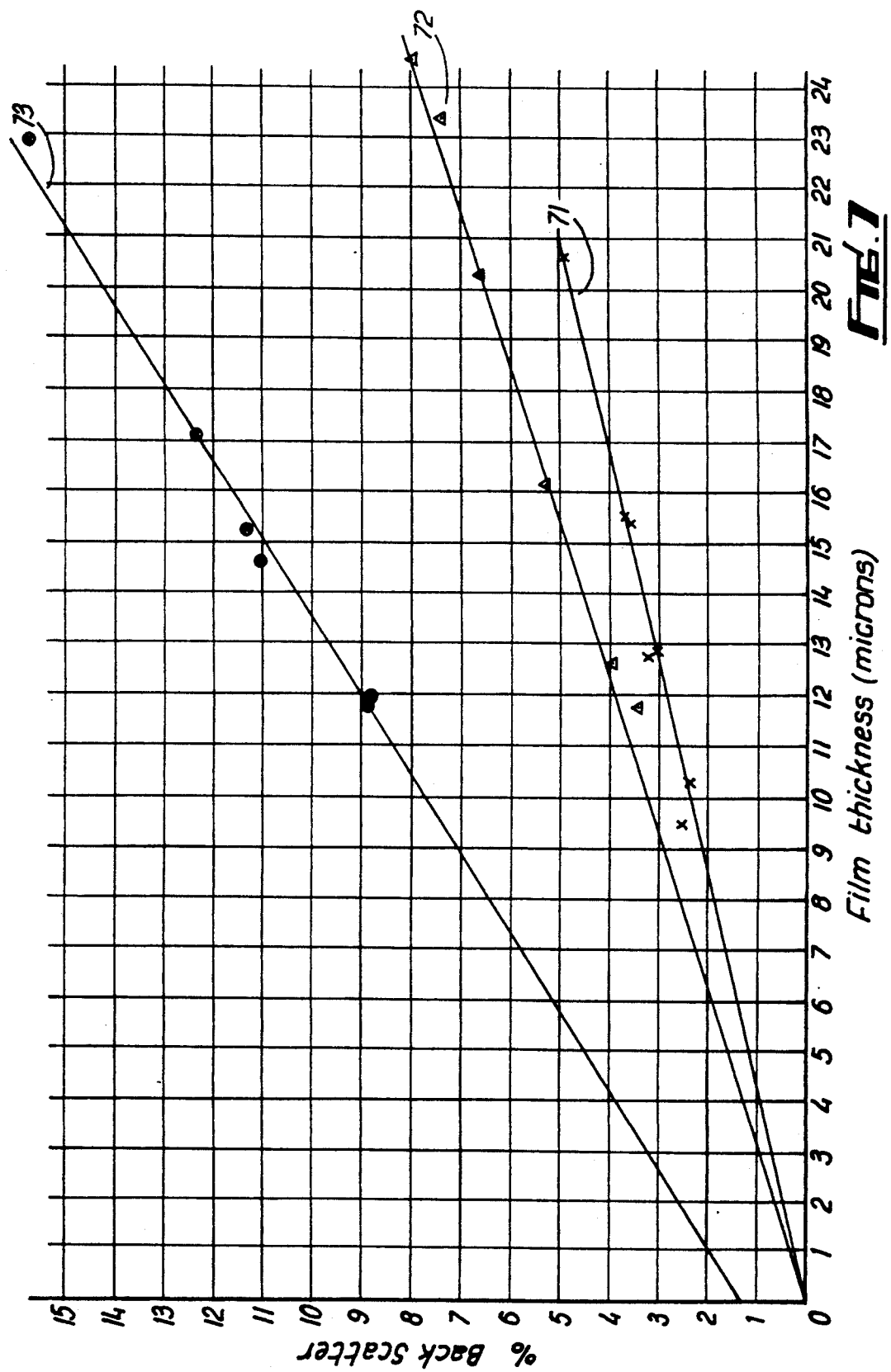
FIG. 7 shows graphs of Flocculation Gradient of specified paints.

In FIG. 7 graph 71, in respect of an emulsion paint in accordance with the invention, shows a gradient of 0.25. The graph goes through the origin and suggests good polymer/pigment contact. Graph 72 is obtained from a liquid alkyd gloss paint. The gradient is 0.32 and, as expected with this paint, the graph goes through the origin. Graph 73 is a typical silk finish emulsion paint. The gradient is 0.78 and the graph does not go through the origin.

An example of an emulsion paint formulation according to the invention is as follows (all parts by weight).

| A. | Colloid Water Phase | |
|---|---|---|
| | Water | 350 |
| | "Natrosol 250 LR" (R.T.M.) | 20 |
| | "Dispex GA-40" (R.T.M.) | 3 |
| B. | Pigment | |
| | Rutile titanium dioxide | 600 |
| C. | Surfactant | |
| | Nonylphenol ether sulphate, sodium salt | 10 |
| | Water | 200 |
| D. | pH Adjuster | |
| | Dilute Acetic Acid - to bring pH to 7.0 | |
| E. | Monomer Mixture | |
| | Vinyl Acetate | 300 |
| | VeoVa 10 (R.T.M.) | 100 |
| | Organic Peroxy Initiator | 3 |
| G. | Post-additions | |
| | Texanol | 40 |
| | Water | As required |

In the above example "Natrosol 250 LR" is a hydroxyethyl cellulose stabilising agent and "Dispex GA-40" is a polyacrylic copolymer dispersing agent.

The water soluble colloid is dissolved in the water by heating at 70° C. for 30 minutes. After cooling to 25° C. the dispersant is added and the pigment (B) dispersed into the colloid water phase (A). The surfactant and water (C) are added and the pH adjusted to 7 with the adjuster (D).

The temperature is raised to 55° C. and the monomer mixture (E) and the reducing agent solution (F) are added gradually over a period of one hour. To complete the polymerisation the temperature is held at 60° C. for a further 45 minutes after which the product is cooled. To the cooled product 40 parts of a coalescing solvent (G) is added (to ensure film formation) to complete the paint formulation. Additional water is added to adjust to given volume solids (see following Table). Similar products have also been made using the continuously-operated tubular loop reactors disclosed in GB 1,220,777 and EP 0,145,325.

For comparison purposes a conventional emulsion paint having the same pigment volume concentration and volume solids as the above example was made by dispersing titanium dioxide in the colloid and dispersing agent and then blending with conventionally prepared vinyl acetate/VeoVa 10 (R.T.M.) copolymer emulsion and the coalescing solvent. The same raw materials were used in both paints in quantities that were as close as practicable.

The conventional paint was based on a copolymer emulsion of ca 0.45 μm average particle size. It can be argued that use of a finer particle size emulsion would bring properties of the conventional paint more in line with those of the inventive example. This is hardly the case, decreasing particle size of the emulsion polymer in a conventional paint increases gloss but not to the level achieved through the invention (see following table). High shear viscosity does not increase and although Flocculation Gradient decreases it does not achieve values close to those of the inventive example. The Flocculation Gradient graphs (FIG. 7) are typical of those obtained from conventional emulsion paint systems whereas the graphs from products of the invention are typical of those obtained from solution polymer systems. That is, the invention offers a water-based emulsion paint which stands comparison with a solvent-based alkyd paint in respect of gloss, rheology, durability and opacity.

The comparison is shown in the Table below.

| Feature | Inventive Example | Conventional Paint |
|---|---|---|
| Viscosity (Haake) at 13 secs$^{-1}$ (25° C.) | 21.3 | 19.5 |
| (ICI Cone & Plate) at 10,000 secs$^{-1}$ (25° C.) | 1.4 | 0.5 |
| % Gloss | | |
| 20° | 55.5 | 30.0 |
| 60° | 80.0 | 70.5 |
| Wet Flocculation Gradient* | 7.4 | 8.7 |
| Dry Flocculation Gradient* | 0.25 | 0.78 |
| Pigment Volume Concentration | 29.7 | 29.7 |
| % Solids (Volume) | 34.2 | 34.2 |

*Flocculation Gradient Monitor (Supplied by Tioxide U.K. Limited)

Flocculation results in inefficient use of pigment. Gloss, colour, durability are affected but loss of opacity commonly causes greatest concern.

The particle size of pigments like titanium dioxide is optimised to give maximum scattering of visible light and hence maximum opacity. Flocculation effectively increases the particle size and results in less efficient scattering of visible light and reduced opacity. The Flocculation Gradient Monitor provides a measure of the degree of flocculation by determination of the scattering of a higher wavelength radiation by the flocculates of pigment in dry or wet paint. A higher gradient indicates greater flocculation.

Flocculation gradient can be directly linked to opacity, in most systems an 0.1 increase in flocculation gradient would be sufficient to result in visually lower opacity.

The predominant points to note from the above table are:

1. The significantly improved high-shear (10,000 secs$^{-1}$) viscosity of the inventive example with little change in low-shear (13 secs$^{-1}$) viscosity. This indicates a rheology improvement high-shear viscosity being closely related to application characteristics. To raise the high-shear viscosity of the conventional paint to 1.4 poise would require at least twice as much thickener. This would result in an unacceptably high low-shear viscosity.

2. The dry flocculation gradient reduction of the inventive example indicates an opacity improvement which can be equated to pigment economy. Scanning electron microscopy of plasma etched films (see FIGS. 5 and 6) has confirmed that the pigment remains very well dispersed as the paint of the invention dries.

3. The markedly improved gloss figures for the invention is typical of such formulations based on the opacifying unit described. The improvements are such that, providing inorganic extenders are added at the polymerisation stage, much higher pigment volume concentrations are achievable using the invention than with conventional systems, for any given sheen level. In conventional sheen paint systems the choice of inorganic extenders and level of addition are severely limited by particle size considerations. One further advantage of the invention is that reinforcing extenders of a wide range of particle size and shape can be formulated into a sheen finish, these being added at the polymerisation stage.

4. Better contact between pigment and polymer achieved in the invention beyond that which is solely dependent on the film coalescence in conventional emulsion paints is believed to produce more durable coatings.

A very wide range of alternative unsaturated monomers is available for use in the polymerisation stage including ethylene and its derivatives such as vinyl chloride, styrene, etc. Acrylics, dienes and all those monomers used in emulsion polymerisation processes are included.

In the Example, the level of dispersant is low (typically less than 1% by weight of the pigment) when compared with other disclosed processes such as that in GB 1,172,513 (which gives encapsulation of pigment particles).

It is believed that, by restricting the dispersant, the dispersant is not present in sufficient quantity to give uniform adsorption on the pigment surface. This creates, on the pigment surface, favoured sites on which polymerisation takes place to give polymer particles and the nodular outline of the opacifying units which enhances those properties sought after in water-based emulsion paints.

We claim:

1. An aqueous surface coating material containing opacifying units prepared in an emulsion polymerisation process in the presence of high refractive index opacifying pigment particles dispersed in a water phase before monomer is added, the units being characterised in that substantially all of the opacifying pigment particles in the units are disjuncted from one another and have non-enveloping appendant polymer particles to give a nodular outline.

2. A material as claimed in claim 1 in which the opacifying units carry substantially all of the pigment and polymer of the material.

3. A material as claimed in claim 1 including one or more of extender pigments, coloured pigments, further opacifying pigments or other opacifying particles either within the opacifying units or separate therefrom.

4. A material as claimed in claim 1 in which the polymer particles are solid and/or gas-encapsulating envelopes in the dried film.

5. A material as claimed in claim 1 in which the polymer particles themselves trap microvoids between themselves or with pigment particles.

6. A material as claimed in claim 1 in which polymer exists in addition to the polymer in the opacifying units and the polymer in the opacifying units has a different degree of ease of coalescence to that of the added polymer or different Minimum Film-Forming Temperature.

7. A material as claimed in claim 1 including a solvent which in the drying film remains behind until the majority of the water is lost from the film but eventually evaporates to give an opacity improvement.

8. A material as claimed in claim 1 which said material is an emulsion paint.

9. An emulsion polymerisation process carried out in the presence of pigment for producing opacifying units as characterised in claim 1, comprising dispersing high refractive index opacifying pigment particles in a water phase before monomer is added, adding monomer to the pigment dispersion, and effecting emulsion polymerisation of the monomer in the presence of the pigment to produce an aqueous dispersion of composite pigment-/polymer particles constituting said opacifying units in which substantially all of the opacifying pigment particles in the units are disjuncted from one another and have non-enveloping appendant polymer particles to give a nodular outline.

10. A process as claimed in claim 9 in which an alkali soluble vinyl or acrylic polymer dispersant is used to disperse the pigment at less than 1% by weight of pigment.

11. A process as claimed in claim 9 in which a water soluble cellulose or starch derivative or polyvinyl alcohol is used as colloid in the polymerisation.

12. A material as claimed in claim 3 in which polymer exists in addition to the polymer in the opacifying units and the polymer in the opacifying units has a different degree of ease of coalescence to that of the added polymer or different Minimum Film-Forming Temperature.

13. A process as claimed in claim 10 in which a water soluble cellulose or starch derivative or polyvinyl alcohol is used as colloid in the polymerisation.

* * * * *